United States Patent
Ravi et al.

(10) Patent No.: US 7,260,809 B2
(45) Date of Patent: Aug. 21, 2007

(54) POWER ESTIMATION EMPLOYING CYCLE-ACCURATE FUNCTIONAL DESCRIPTIONS

(75) Inventors: Srivaths Ravi, Plainsboro, NJ (US); Anand Raghunathan, Plainsboro, NJ (US); Lin Zhong, Princeton, NJ (US); Niraj K. Jha, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 11/278,182

(22) Filed: Mar. 31, 2006

(65) Prior Publication Data

US 2007/0022395 A1    Jan. 25, 2007

Related U.S. Application Data

(60) Provisional application No. 60/702,352, filed on Jul. 25, 2005.

(51) Int. Cl.
*G06F 17/50* (2006.01)
(52) U.S. Cl. ............................. 716/18; 716/4
(58) Field of Classification Search ............... 716/4–5, 716/18
See application file for complete search history.

(56) References Cited

U.S. PATENT DOCUMENTS

| | | | | |
|---|---|---|---|---|
| 6,598,209 B1 * | 7/2003 | Sokolov | ............ | 716/4 |
| 6,901,565 B2 * | 5/2005 | Sokolov | ............ | 716/4 |
| 2005/0223344 A1 * | 10/2005 | Sato et al. | ............ | 716/1 |
| 2006/0058994 A1 * | 3/2006 | Ravi et al. | ............ | 703/23 |

OTHER PUBLICATIONS

Ravi, s. et al., "Efficient RTL power estimation for large designs", Jan. 2003, IEEE, VLSI Design, 2003. Proceedings. 16th International Conference on. pp. 431-439.*
Potlapally, N., et al., "Accurate power macor-modeling techniques for complex RTL circuits", 2000. IEEE, pp. 235-241.*
Zhong, L., et al., "Power estimation for cycle-accurate functional descriptions of hardware", Nov. 2004. IEEE. pp. 668-675.*

* cited by examiner

*Primary Examiner*—Stacy A Whitmore
(74) *Attorney, Agent, or Firm*—Brosemer, Kolefas & Associates

(57) ABSTRACT

A method for estimating the power consumption of an electronic circuit under design that employs a Cycle-Accurate Functional Description (CAFD) which advantageously provides the accuracy achieved by RTL power estimation with the speed and speed of higher-level approaches.

17 Claims, 12 Drawing Sheets

POWER ESTIMATION EMPLOYING CYCLE-ACCURATE FUNCTIONAL DESCRIPTIONS

CROSS REFERENCE TO RELATED APPLICATIONS

This application claims the benefit under 35 U.S.C. § 119(e) of U.S. Provisional Application No. 60/702,352 filed Jul. 25, 2005, the entire contents and file wrapper of which are hereby incorporated by reference for all purposes into this application.

FIELD OF THE INVENTION

This invention relates generally to the field of integrated circuit (IC) design and in particular to a power estimation method employing cycle-accurate functional descriptions of hardware designs.

BACKGROUND OF THE INVENTION

In order to provide information about the power consumption of circuits under design, a variety of power estimation techniques have been developed. Advantageously, such techniques operate at a number of conceptual "levels" of design—from the very basic transistor level to the higher— and more logical—register transfer level (RTL). Since these techniques are relatively mature, an array of commercially available tools have been developed employing their techniques.

Of particular significance, since an RTL description is structurally defined, the power estimate for a circuit so represented is typically performed by aggregating the individual power estimates for its constituent RTL components. Since extensive research has been performed to characterize the individual RTL components, such RTL power estimates are relatively efficient for designs of limited size. Unfortunately, for large designs RTL-based power estimation may be prohibitively slow—especially when a power vs. time profile is required.

In somewhat related efforts, attempts to determine power estimates through functional (or behavioral) methods—without regard to underlying RTL implementations—have met with limited success. Although generally much less accurate than RTL methods, functional methods are quite fast. As a result, their applicability has been limited to fairly coarse-grained design decisions such as comparing algorithmic alternatives.

Accordingly, power estimation techniques that provide the accuracy of RTL methods with the speed of functional techniques would represent a significant advance in the art.

SUMMARY OF THE INVENTION

We have developed, in accordance with the principles of the invention, method for estimating the power consumption of an electronic circuit under design that employs a Cycle-Accurate Functional Description (CAFD) which advantageously provides the accuracy achieved by RTL power estimation with the speed and speed of higher-level approaches.

In contrast to temporal sampling approaches used at the gate level, our technique exploits an understanding of the CAFD structure, by performing independent sampling and maintaining a separate power history for each control state. This leads to a high accuracy for cycle-by-cycle power estimates in addition to accurate average power estimates.

BRIEF DESCRIPTION OF THE DRAWING

A more complete understanding of the present invention may be realized by reference to the accompanying drawing in which.

DETAILED DESCRIPTION

Figure 1:
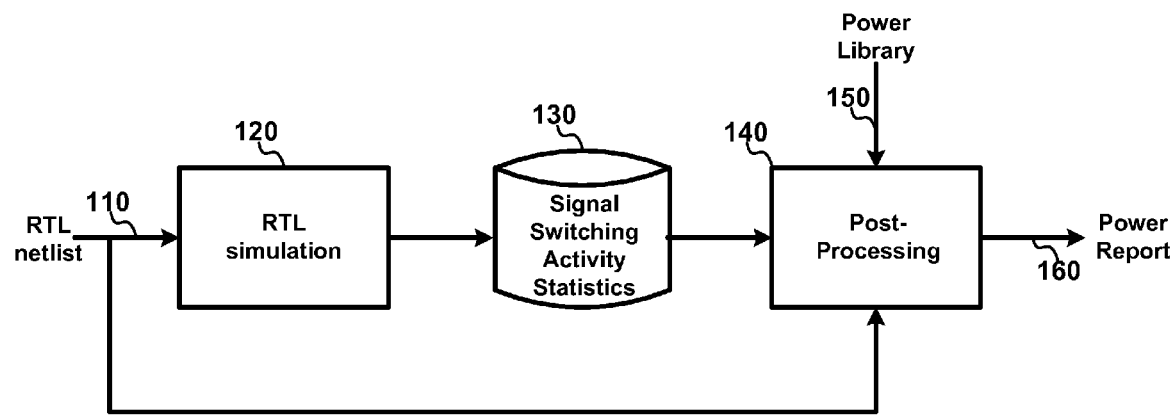
FIG. 1 is a schematic block diagram of a PRIOR ART RTL power estimation scheme.

With initial reference to FIG. 1, there is shown a block diagram of a prior art RTL power estimation flow. More specifically an RTL netlist 110 is used to perform an RTL simulation 120 which in turn gathers a set of signal switching activity statistics 130 for a given test bench. This activity data is used by a power estimation engine—in a post processing phase 140—in conjunction with power data contained in a gate-level power library 150 to compute the power consumption, the results of which are typically provided in a power report 180. As noted prior, this approach generally suffers from the slow speed associated with an RTL simulation especially for large (multi-million gate) designs.

Cycle-Accurate Functional Descriptions (CAFDs) are being widely adopted in integrated circuit design flows and are commonly used for specification, simulation, validation and architectural exploration of hardware. The emergence of C-based hardware description languages (HDLs) to support these levels of abstraction that are higher than RTL has facilitated this trend. Accordingly, our inventive method which provides power estimation employing CAFDs supplements these trends.

Figure 2:
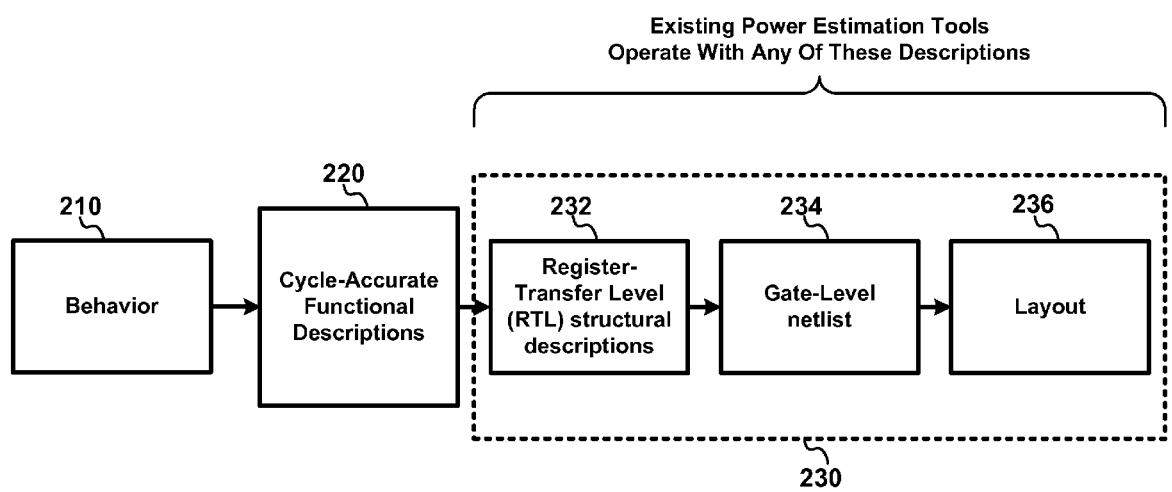
FIG. 2 is a schematic block diagram showing the design hierarchy and power estimation support.

With reference now to FIG. 2, there is shown a block diagram depicting where—in the design/power estimation hierarchy—our inventive method resides. As can be observed from that FIG. 2, the underlying layout 236, gate-level netlist 234, and register transfer level structural descriptions 232 are known to operate with existing, prior art power estimation tools 230. Advantageously, our inventive cycle accurate functional description methodology 220, works in conjunction with the existing descriptions 230, at a level closer to the purely behavorial model 210. Consequently, the circuit designer may work at a higher level of abstraction (closer to pure behavior) while not being swamped with lower-level details.

In employing our inventive method, we begin by assuming that for a particular CAFD, its corresponding RTL implementation is known. We view the CAFD as an abstraction of a specific RTL implementation, which is used in its place to efficiently produce the power estimation. The resulting RTL-aware CAFD is simulated, together with power model libraries of various RTL components to produce the power estimate.

Before describing our inventive method in specific detail however, it is useful to first provide some additional background. Cycle-Accurate Functional Descriptions accurately specify the behavior of a circuit for each cycle of its operation. Consequently, from an Input/Output perspective, they are indistinguishable from structural RTL descriptions.

CAFDs advantageously achieve simulation efficiency by omitting internal structural details of the circuit. For example, a user may be able to observe values of only a subset of registers that are present in a particular implementation. Additionally, CAFDs may not be bit accurate, i.e., they may use more efficient data types such as integers, to replace bit vectors where possible.

For our purposes of power estimation, we will focus on a popular class of CAFDs, called state-based CAFDs in which the design is represented as an extended finite-state machine (FSM) with functional descriptions for each state. Each functional element within the CAFD (operation, assignment or variable reference) belongs to a unique state.

Figure 3:
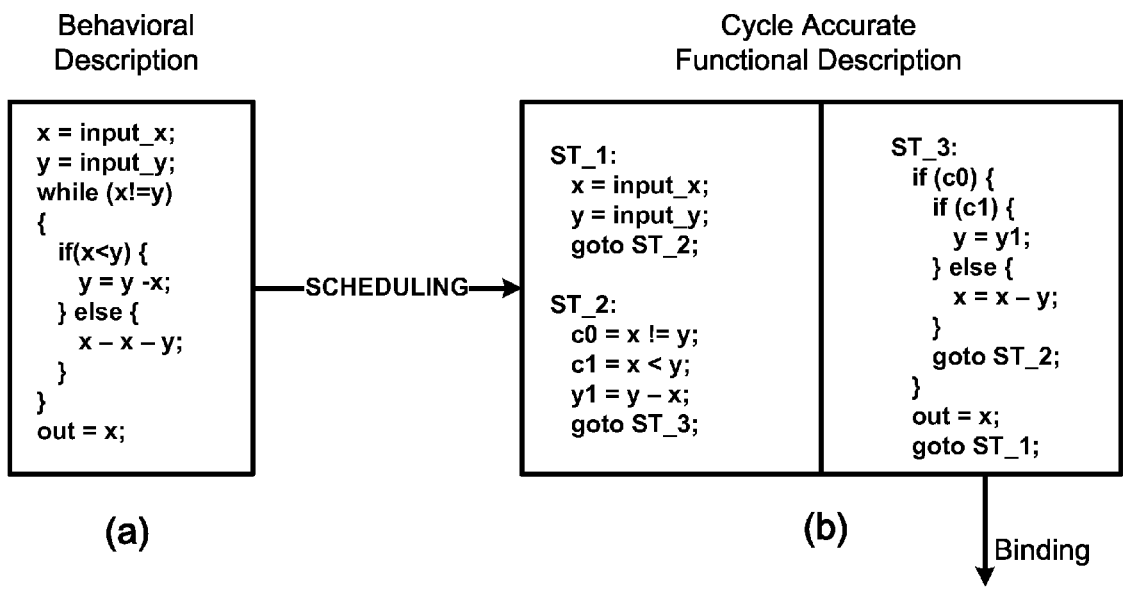
FIG. 3a is behavioral description of an illustrative Greatest Common Divisor (GCD) implementation according to the present invention.
FIG. 3b is a Cycle-Accurate Functional Description (CAFD) of the GCD implementation of FIG. 3a, according to the present invention.
FIG. 3c is a schematic block diagram of a Register Transfer Level (RTL) description of the GCD implementation of FIG. 3a, according to the present invention.

With reference now to FIG. 3a, there is shown an example behavior that computes the greatest common divider (GCD) of two integers. Usefully, the functional description of GCD is presented in a C-like language. For cycle-accurate simulation, the functional description of GCD is scheduled into a CAFD as shown in FIG. 3b. As can be observed in that FIG. 1b, the CAFD is shown decomposed into control states, marked ST_1, ST_2, and ST_3, respectively.

When a CAFD is synthesized into an RTL implementation, the synthesizer assigns functional elements to RTL components. And while the synthesizer knows how a functional element is implemented in hardware, this knowledge is often discarded after synthesis. Accordingly, we extract this information and use it to enhance the CAFT—for more-accurate power estimation.

Importantly, RTL components, such as registers, functional units, memories, and data-transfer interconnects, can be associated with functional elements in the CAFD. As such, they are said to be functionally-explicit. If a functionally explicit RTL element is active in a state, i.e., one of the functional elements from that state is mapped to it, the values of its inputs and outputs can be obtained from the CAFD by tracing the appropriate variables.

Worth noting, it is difficult to estimate power consumption based upon CAFD alone, since it does not specify the components utilized in the circuit. For example, the CAFD shown in FIG. 3b—for the GCD example—can be synthesized using either one subtracter or two subtracters, and using either one multi-function comparator or separate < and !=comparators. Furthermore—and as can be readily appreciated by those skilled in the art—even if the number of components in the implementation is fixed, the manner in which the operations and variables in the CAFD are mapped to components may affect power consumption. However—and in sharp contrast—if an RTL implementation is supplied, accurate CAFD power estimation information can be derived from it.

Figure 3C:
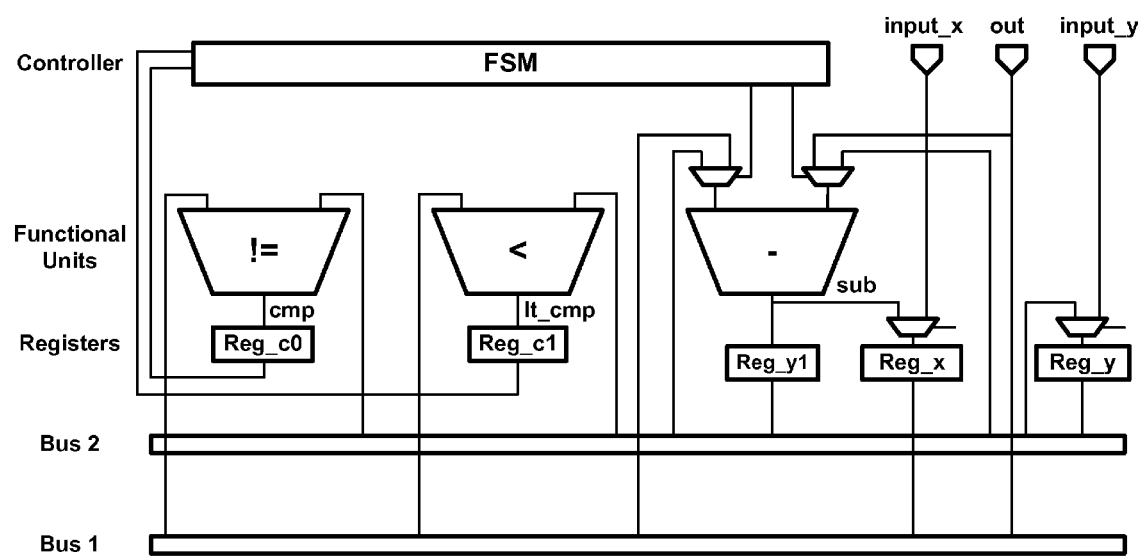

For example, for the RTL implementation shown in FIG. 3c, we know that all subtraction operations are bound to the single subtractor (SUB), as shown in the figure. This implies that, whenever the CAFD is in control state ST_2, the subtracter performs the operation y1=y−x, which implies that the inputs to the subtracter assume the value of variable y1. If we were able to deduce the inputs to each component in each CAFD state (equivalently, each simulation cycle), we could perform accurate power estimation using power macro-models for each RTL component.

Unfortunately, it is not clear what I/O values of the subtracter are for state ST_1 in which there are no CAFD operations mapped to it, i.e., it is idle. These values depend on how the multiplexers feeding the subtracter are configured in the idle cycle, and the values at the selected data inputs.

We now define the accuracy metrics used in our inventive method. Consider a circuit and an input testbench of N cycles. Let P(i), i=1,2, ..., N, denote the power consumption of the circuit on the ith cycle, as estimated by a reference power estimation tool (preferably RTL, or gate-level). Let P'(i) denote the power estimate for the ith cycle. $P_{avg}$ and $P'_{avg}$ are the corresponding average power estimates over the entire testbench. The average or accumulate power estimation is then given by;

$$Avg \cdot \mathrm{Error} = \left| \frac{P'_{avg} - P_{avg}}{P_{avg}} \right| = 100\%$$

The absolute cycle power error (ACPE) for the ith cycle is defined as $$ACPE(i) = \left| \frac{P'_{avg} - P_{avg}}{P_{avg}} \right| - 100\%$$

The average ACPE (AACPE) over the N cycles is used to measure the accuracy of cycle-by-cycle power estimation. Naturally, obtaining a low AACPE is more challenging then obtaining a low average power error.

Figure 4:
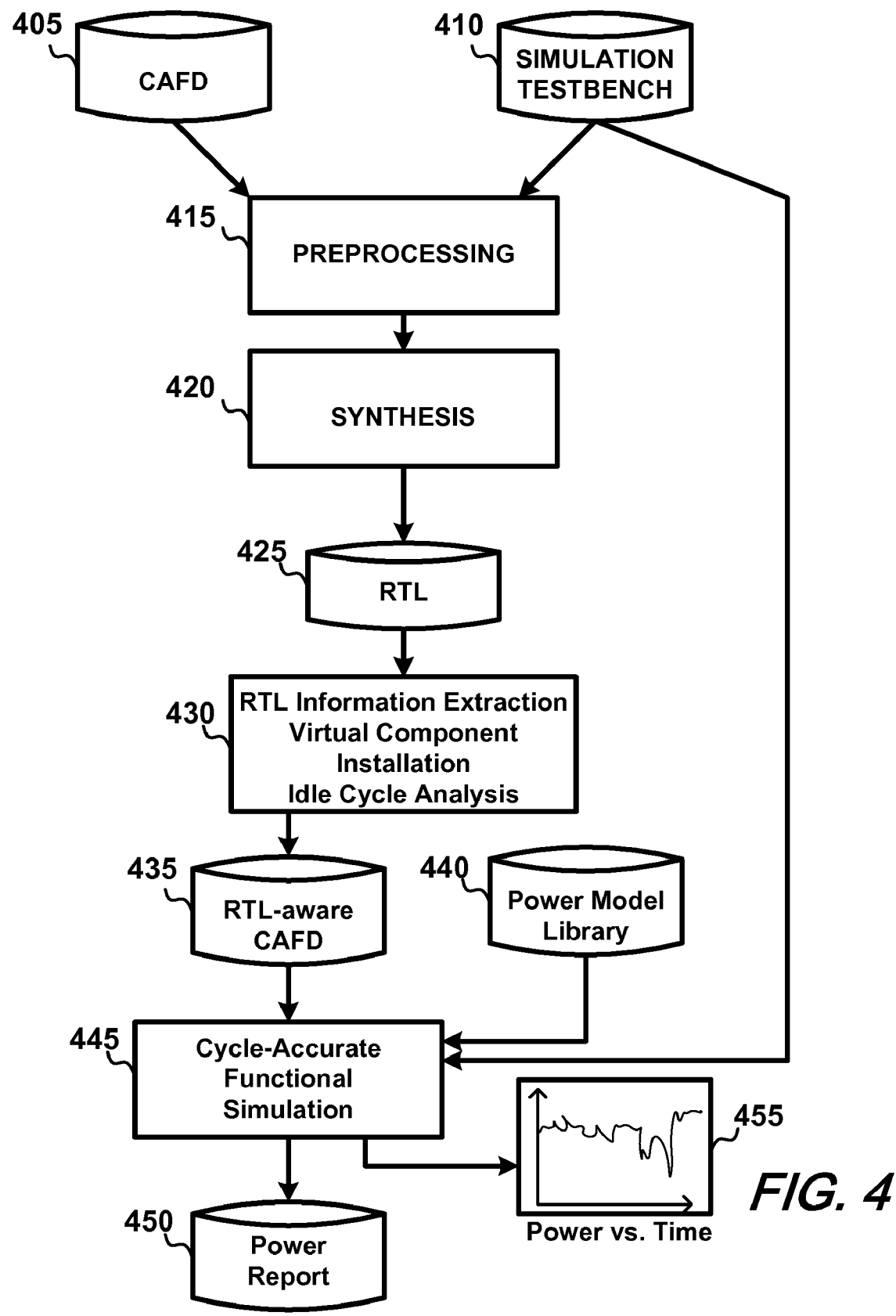
FIG. 4 is a schematic block diagram showing an overview of the power estimation method according to the present invention.

Turning our attention now to FIG. 4, there it shows an overview of our inventive methodology for CAFD power estimation. More particularly, we are provided a CAFD 405 and corresponding simulation testbench 410, and a power model library 440 for RTL components. The library contains power macromodels for each type of RTL component, which express power consumption as a function of the current and previous input vectors seen at the component's I/Os. The power model library is generated once for each fabrication technology, using well known, characterization techniques.

The CAFD is first preprocessed 415 in order to enable easier back annotation of RTL information, and then subjected to high-level synthesis 420 to generate an RTL implementation 425. Alternatively, the CAFD may be generated as an intermediate by-product of high-level synthesis starting from a pure behavioral description.

The preprocessed CAFD and RTL implementation are analyzed to derive the minimum necessary information and back-annotate it into the CAFD. This step 430 includes the tasks of virtual component instantiation and idle cycle analysis, resulting in an RTL-aware CAFD 435. The RTL-aware CAFD is co-simulated with the power model library 440 under the given testbench to generate an average power report 450 or power vs. time waveforms 455.

Figure 5:
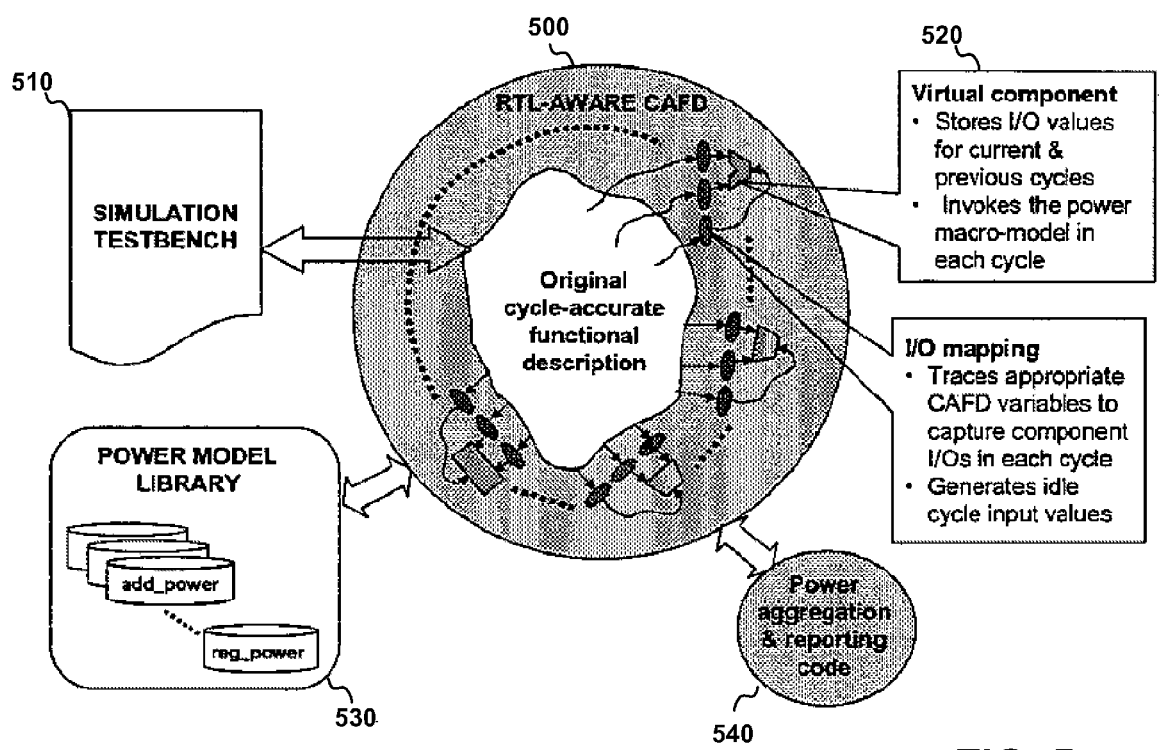
FIG. 5 is a schematic block diagram showing the composition of an RTL aware CAFD and its use for power estimation according to the present invention.

The composition of an RTL-aware CAFD is shown schematically in FIG. 5. In particular, our inventive method enhances the original CAFD for power estimation. The enhanced regions, depicted as shaded, include "virtual components' which are automatically instantiated by our methodology corresponding to each component in the RTL implementation. Unlike components in a structured RTL description, virtual components do not simulate the actual functionality of the component they represent. Instead, they act as placeholders to collect the information necessary to invoke the power model, i.e., the components I/O values in the current and previous cycles.

Virtual components 520 are responsible for invoking the component power model during each simulation cycle, and storing the resulting power estimate for use in power aggregation and reporting. The RTL-aware CAFD also includes automatically generated I/O mapping code that maps the values of CAFD variables to the I/O values for virtual components. The power aggregation and reporting code 540 sums up the power values from all the virtual components according to the circuit hierarchy and keeps relevant statistics such as the power breakdown by component type. It is also responsible for generating the average power consumption report, or a power vs time dump that can be viewed using standard waveform viewers.

We now describe our methodology underlying the RTL information extraction depicted in FIG. 4.

Preprocessing: To facilitate the back-annotation of RTL information into a CAFD, we preprocess 415 the CAFD so that each functional element is given a unique identifier, for example, the name and line number at which it appears in the CAFD. This may require the decomposition of lines that contain multiple or complex statements.

The preprocessing step 415 ensures that all inputs to operations in the CAFD are exposed to CAFD variables. For example, complex arithmetic expressions such as d=a+b*c and d=a=tmp. This may increase the number of variables in the CAFD in general, but from our experience the attendant overhead in code size and execution time is quite small.

RTL Information Extraction: The RTL information extraction step correlates RTL components to CAFD functional elements, and establishes relationships between component inputs/outputs and CAFD variables.

For each state in a CAFD, we generate a mapping table to map its functional elements into RTL components. The table also records the type and bit width of the RTL components, the names of inputs and outputs, and the RTL components to which these names are mapped. Functional elements are identified by their name and the CAFD code line number.

Advantageously, an RTL implementation 425 not only provides binding information but also connectivity information. We need the synthesizer to record the connectivity information of each multiplexer, i.e., which RTL components are connected to the data inputs. A connectivity table with this information is generated for each multiplexer that drives the input of a functionally-explicit RTL component such as a functional table or register.

Furthermore, we generate a select signal table for each multiplexer that specifies which of its data inputs is selected in each control state. In states where the functionally explicit components driven by the multiplexer is active, the select signal value can be determined by simply examining which multiplexer input needs to be routed to the component for it to perform the CAFD operation mapped to it. In states where the functionally explicit component driven by the multiplexer is active, the select signal value can be determined by simply examining which multiplexer input needs to be routed to the component for it to be perform the CAFD operation mapped to it.

In states where the funcionally-explicit component driven by the multiplexer is idle, this information can be deduced by analyzing the cone of control logic that feeds the multiplexer select signals in the RTL implementation. Whenever the values cannot be decided statically, a random choice is made. As can be appreciated, this information is used by the virtual component instantiation and idle cycle analysis techniques.

Virtual Component Instantiation and I/O Mapping: A virtual component is instantiated for each functionally-explicit RTL component and each multiplexer to keep a record of previous and current input vectors.

Figure 6:
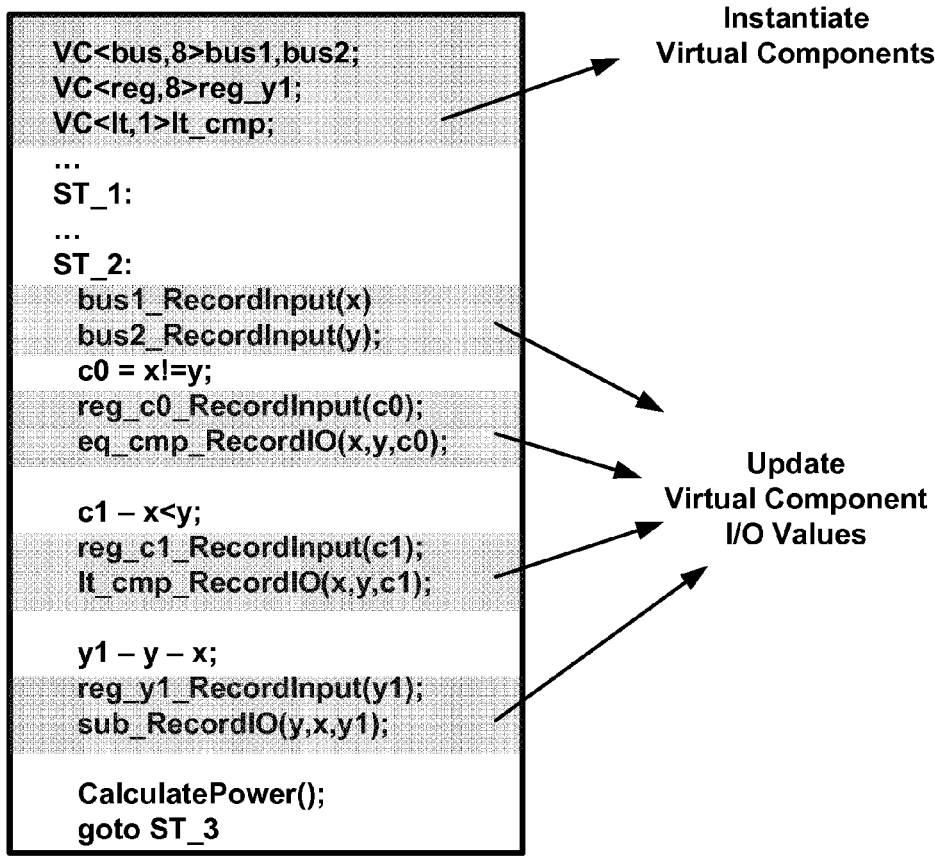
FIG. 6 shows a portion of the RTL-aware CAFD for the GCD example according to the present invention.

For a CAFD code line containing a functional element, an update to the corresponding virtual component's I/O values is performed, by capturing the values of the appropriate CAFD variables. For example, a part of the RTL-aware CAFD for the GCD circuit is shown in FIG. 6, wherein the virtual component updates for control state ST_2 are shown in detail.

Note that the I/O updates described only affect components that are active in the current cycle. Optionally, each virtual component also contains a pointer to the virtual components that drive its inputs. For example, the virtual component corresponding to the subtracter in the GCD circuit (See, FIG. 3c), contains pointers to the virtual components corresponding to the two multiplexers that drive its inputs. As we shall later see, this is used to obtain input values for the idle cycles. Each virtual component uses a circular queue of depth two to keep track of the input and output values for the current and previous cycles.

Idle-Cycle Handling: For any given control state in the CAFD, the input/output values of idle RTL components cannot be directly deduced from the CAFD or the mapping tables. In general, this is a difficult problem if the RTL circuit has arbitrary structure. Fortunately, most high-level synthesis tools generate RTL implementations that are structured to have multiplexers at the inputs of functionally-explicit components (such as registers and functional units). Furthermore, the inputs to these multiplexers come from the outputs of other functionally-explicit components. Given this property, idle cycle inputs to a component can be inferred from the implementation style and the component's input multiplexers.

For example, if an AND-OR based selector is used to implement the multiplexer, the multiplexer's output is set to zero in idle cycles. Alternatively, if tristate-based multiplexers are used, the multiplexer's output is set to the same value as in the previous active cycle. For most other multiplexer implementations, one of the multiplexer's inputs is routed to the output.

Advantageously, all of the above situations may be handled by our virtual components, as they can record both the values of inputs and the pointers to the RTL components connected to their inputs in the previous active state. One important aspect is to be able to identify the style of its input multiplexers used during synthesis.

Sources of Error: Advantageously, our inventive approach guarantees the same accuracy as RTL power estimation for functionally-explicit RTL components, which make up the circuit datapath. However, functionally-implicit components (multiplexers and control logic) impose a limit on the achievable accuracy.

Large industrial application-specific integrated circuits (ASICs) usually have relatively small controllers compared to their datapaths. For example, the combinational components of the controllers contribute 1%-3% to the total power in benchmark circuits. We then estimate the power consumption in the control logic by making a note of its RTL components, and analyzing each control state transition with corresponding RTL power models and a constant switching activity factor for the status inputs from the datapath. The resulting numbers are used to generate the power consumed by the control logic in each state. Advantageously, this approach results in small estimation error.

Multiplexers are much more important in terms of power consumption. Therefore, virtual components are instantiated for them. The connectivity and select-signal tables enable us to obtain the input values to the multiplexer in every state. Error is introduced only when a random choice is made during select-signal table generation. As demonstrated through our experimental results, these sources do not significantly affect our accuracy.

Adaptive State Based Sampling: The basic approach detailed previously updates the virtual components and calculates power for every component in every cycle. The associated computational overhead can slow the simulation manifold depending on the implementation. The spatial sampling techniques proposed can be readily used to alleviate the "every-component" problem, i.e., by targeting only the important components. For our purposes, we target only the important cycles for expending computational effort for power estimation.

Our method works as follows: During CAFD simulation, we use a sampling probability to determine whether or not detailed power estimation will be performed in the current simulation cycle. This probability is dependent on which control state of the CAFD is executed (hence the term "state-based"). Furthermore the sampling probability is adaptively varied over time to tightly control the estimation error, as we will describe later. (hence the term adaptive).

In cycles chosen for sampling, we perform virtual component I/O updates, invoke the power macro-models for each component, and aggregate the power consumed by all components, as described herein. In order to produce power estimates for cycles that are not chosen for sampling, we maintain a small amount of power consumption history for each control state in the CAFD.

For example, for a state ST_1, we maintain the power consumption calculated during the last k sampled cycles for which the CAFD was in state ST_1. We view this state-based history of power values as a time series for which we need to predict our next value. This is achieved using simple functions of the history values to estimate the power consumed in the current simulation cycle.

In contrast to temporal sampling approaches used at the gate level, our technique exploits an understanding of the CAFD structure, by performing independent sampling and maintaining a separate power history for each control state. This leads to a high accuracy for cycle-by-cycle power estimates in addition to accurate average power estimates.

Rationale: Our rationale for our inventive adaptive state-based sampling strategy is as follows. The power consumption characteristics of circuits are quite different when they are in different control states. Some control states exhibit a high variance in power consumption, while other states display a relatively predictable behavior.

Several circuits display significantly time-varying power characteristics. Sampling techniques that ignore the time-varying nature may generate accurate average power estimates, but usually result in poor cycle-by-cycle estimates.

In order to illustrate the above operations, we consider an example design, HDTV-1 which is an image filter module used in an SoC for HDTV applications. The CAFD for the HDTV-1 design contains a number of control states for our discussion, namely A, B, C, and D.

Figure 7A:
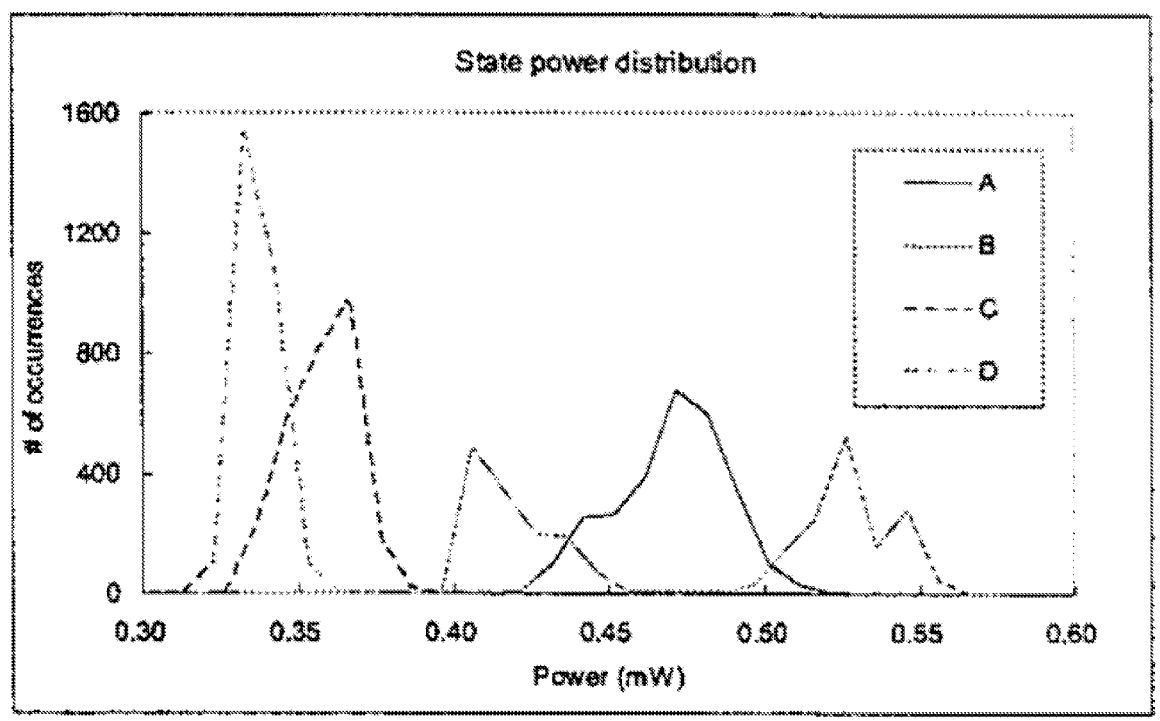
FIG. 7a is a graph showing the power characteristics for four states of the HDTV-1 illustration according to the present invention.

FIG. 7a shows the power histograms for the HDTV-1 circuit when it is each of the four states, A-D. This information was derived using a commercial RTL power estimation tool. The X-axis in FIG. 7a indicates the power consumption in milliwatts (mW), while the Y-axis indicates the number of occurrences of that state with the given power consumption. We can see from this figure that the power distribution of different states can be quite different in terms of mean and standard deviation. The distributions for states A, C, and D, are single-peaked, while state B exhibits a double-peaked power distribution.

Figure 7B:
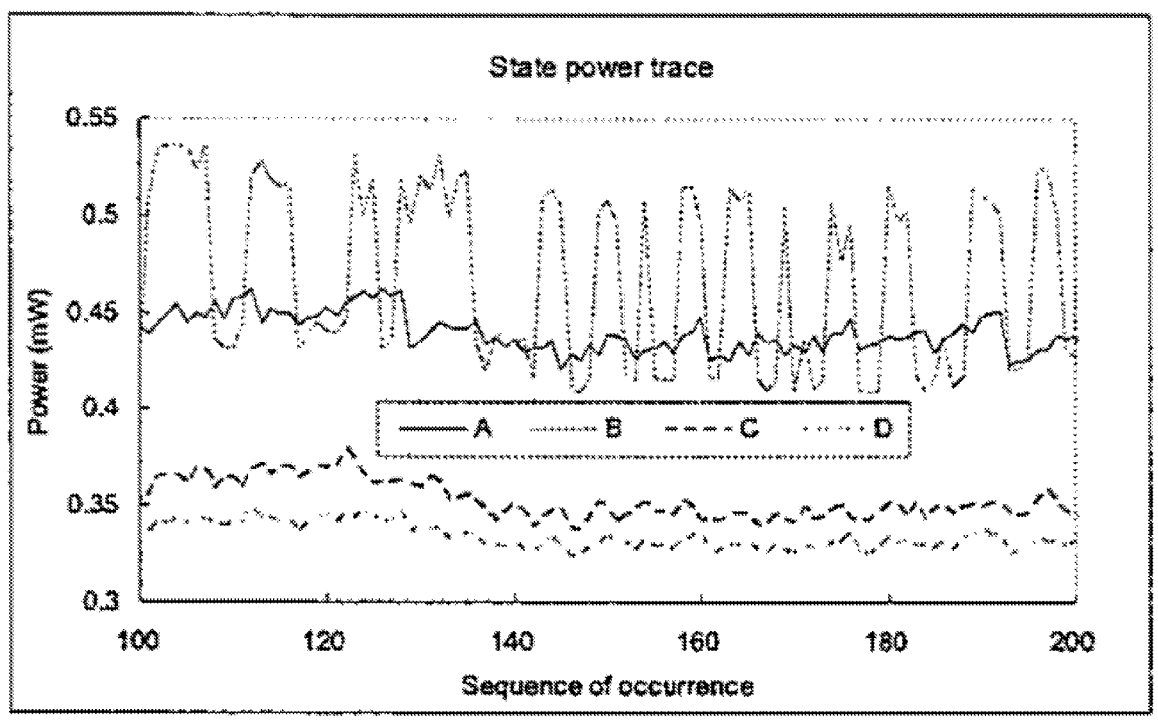
FIG. 7b is a graph showing power vs. time for the HDTV-1 illustration according to the present invention.

FIG. 7b is a plot of the power consumption for each state over time. The X-axis represents the occurrence of the number of that state, i.e., the first time the state occurs, the second time it occurs, and so on. Again, it is quite clear that different states have significantly differing power characteristics. In particular, state B displays a relatively large variation over time.

Sampling Technique: The above observations motivate us to consider sampling (calculating) a state's power consumption in only some of its occurrences, and estimating it in others based on past samples. Two important questions need to be answered however, namely when to sample and how to estimate power using the history.

Adaptive Sampling: As we have noted before, different states have different power-value localities and temporal power variations, which suggests that we devote more computing resources to states whose power varies considerably and to occurrences of a state in which power varies faster. In sampling techniques, the sampling probability is the "knob" that may be used to control the amount of computation effort allocated. Therefore, with our feedback-driven adaptive sampling scheme, a sampling probability is determined for each state.

With this scheme, all states start with the same sampling period. Whenever a state's power is sampled, it is compared with the "estimated" value. If the observed ACPE is larger than a maximum error threshold, the state's sample period is decreased by one "step" unless the period has already reached the minimum period. Otherwise, if the ACPE is smaller than a minimum error threshold, the sample period is increased by one step unless it has already reached the maximum period.

Note that the minimum and maximum periods are used ton control the adaptation so that it does not go too far. In our evaluations, they are set to 1 and 30 occurrences, respectively. In theory, if the maximum period is too large, the sampling period may become so large that adaption is unresponsive to errors. However, our experiments showed that accuracy degrades only slightly even when the maximum period is relaxed to infinity. The stop controls the adaption granularity, and is set as two occurrences in all our experiments.

The speed-accuracy tradeoff can be controlled in our adaptive sampling technique by changing the values of the various parameters described. A shorter step and tighter error thresholds, result in higher accuracy at the cost of increased computational effort. The net effect of the adaptive state-based sampling technique is to optimize the allocation of sampling probabilities to different control states such that states with a higher time-variance of power will be sampled more frequently.

Figure 8:
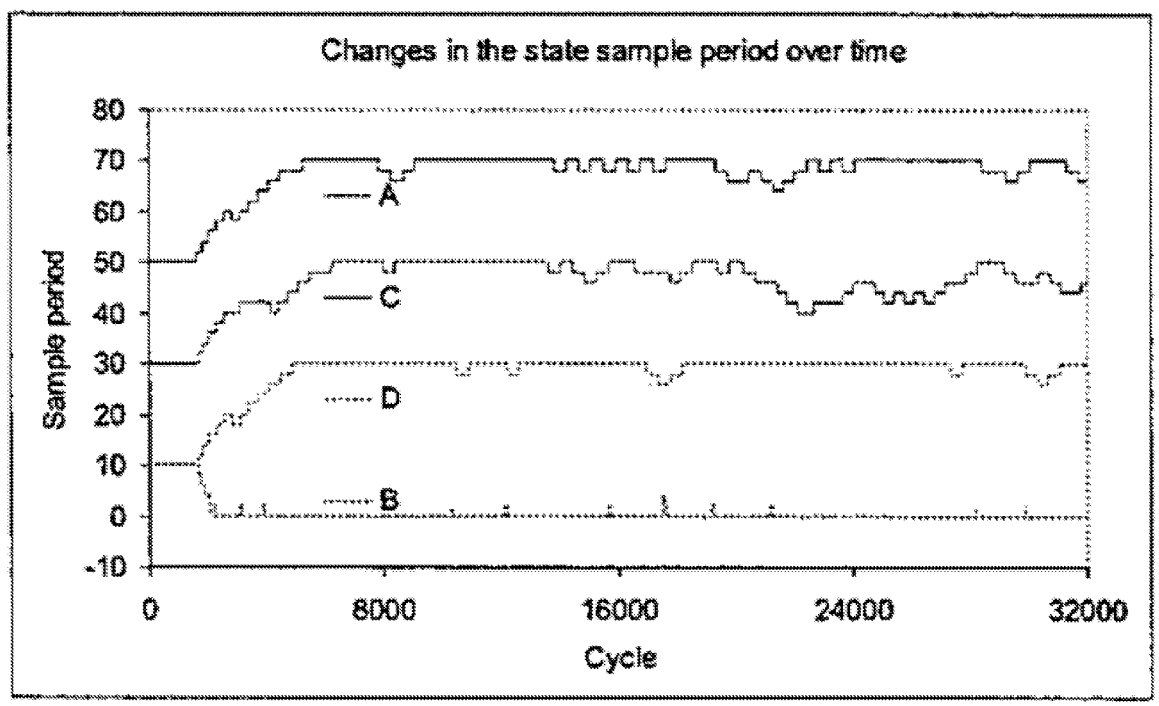
FIG. 8 is a graph showing variations in the sampling period over time, for four different states of the illustrative HDTV-1 design, according to the present invention.
Figure 9:
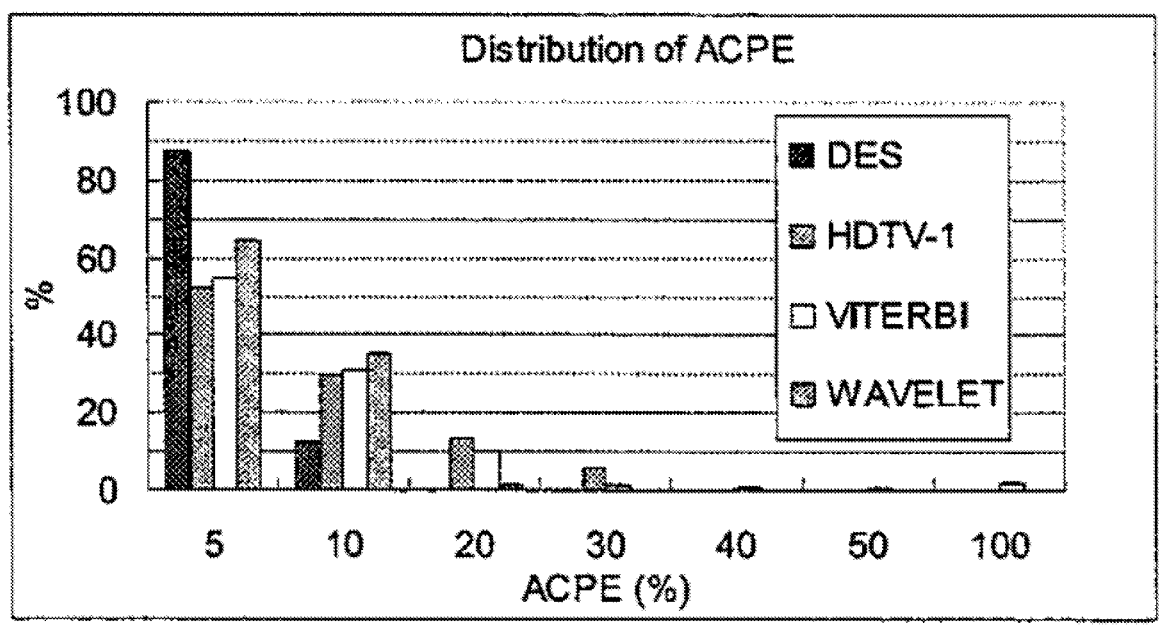
FIG. 9 is a graph showing ACPE distribution.
Figure 10:
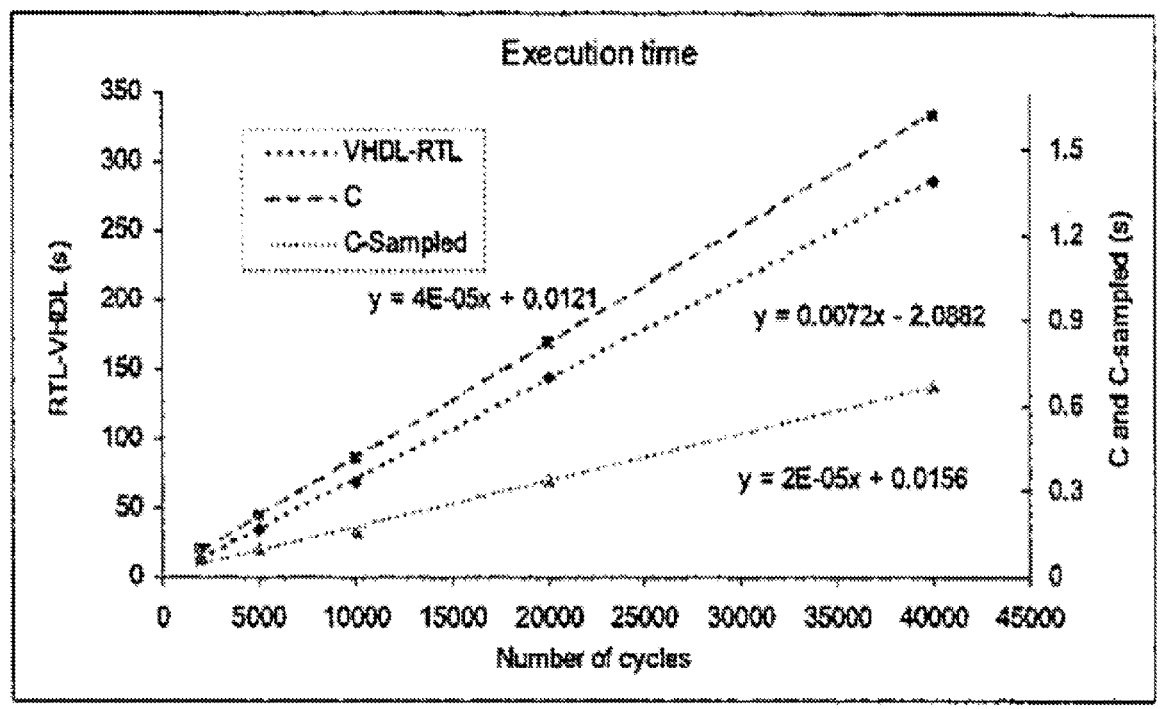
FIG. 10 is a graph showing execution times for RTL-VHDL using C-based power estimation according to the present invention.

In order to illustrate this, we plot in FIG. 8 the variation of the sampling period over time, for the four states A-D, in the HDTV-1 benchmark. For the sake of clarity, in FIG. 8, the waveforms corresponding to states A and C have been shifted up by 40 cycles and 20 cycles, respectively.

Referring once again to FIG. 7, we can see that state B has a relatively high standard deviation and exhibits higher power variation over time. As a result, the adaptive state-based sampling technique decreases the sampling period for state B (i.e., increases the sampling frequency), in this case to the minimum value. On the other hand, the sampling frequency for states A, C, And D is initially increased to the maximum value, but subsequently adapted when errors above the maximum threshold are observed.

History-Based Estimation Policy: We now address the "how to estimate" question posed earlier. Unlike the classical time series prediction problem, the history we have for the power consumption of a state is quite sporadic since we only have a sampled, instead of complete history. Moreover, since power estimation has to be carried out in every cycle, it has to be very efficient.

We experimented with several choices. A simple estimation can be based on the mean of past samples. If we assume the state power has a normal distribution and different occurrences of the same state behavior independently of each other, they can be viewed as a stationary Gaussian time series for which the minimal mean square error is achieved when the mean of the past values is used as the predicted value for the next occurrence. However we observed that different occurrences of the same states are actually slightly related to each other and the autocorrelation drops rapidly as the distance (lag) between samples increases. Such a vanishing dependence makes the mean prediction not as good as a mean of a limited history, which in turn is worse than the weighted mean of a limited history with smaller weights for older samples. Our experiments show that a weighted mean based estimation slightly outperforms the mean and significantly outperforms extrapolation-based estimation. Therefore, the weighted mean approach is adopted in our implementation.

Another concern is the history size, i.e., the number of past samples, used for estimation. Our experiments show that increasing the history size beyond four does not yield much accuracy benefit. Hence, unless otherwise indicated, four past samples are used in all our implementations. The power consumption, $P_S(n)$ for the nth occurrence of state S is estimated as:

$$P_S(n)=0.4 \cdot P_S(m_1^S)+0.3 \cdot P_S(m_2^S)+0.2 \cdot P_S(m_3^S)+0.1 \cdot P_S(m_4^S)$$

where $m_1^S$, $m_2^S$, $m_3^S$, and $m_4^S$ are the most recent four occurrences S, (where $m_1^S$ is the most recent, then $m_2^S$, and so on) for which power is sampled instead of estimated. Such an estimation is much simpler than using RTL power models, and results in substantial speedup.

Experimental Results

We now describe how our inventive CAFD power estimation techniques are integrated in the context of a commercial C-based design flow. We then show our results for applying the techniques to a number of large industrial designs.

Implementation: We implemented our RTL-aware adaptive state-based sampling approach in the context of the CYBER C-based commercial design flow. For any input function description and resource constraints, CYBER performs high-level synthesis and generates an optimized RTL description in VHDL and the corresponding CAFD in C or SystemC. The CYBER design flow also provides an RTL power estimation tool that uses pre-characterized power macro-models (also described as simulatable VHDL entities) for various RTL components.

RTL awareness: CYBER tags the output RTL VHDL description and C-Based CAFD with the corresponding code line numbers of the input functional description for the purpose of debugging. We were able to gernerate most of the RTL information by matching the tags in both the RGL VHDL description and the C-based CAFD. We first preprocessed the functional description so that tag matching is facilitated as described to study the variation of execution time with the length of simulation, for the HDTV-1 benchmark. The results show that C-based power estimation is asymptotically more than 180 times faster than RTL VHDL in this case. The use of adaptive sampling further improves this speedup.

At this point, while we have discussed and described our invention using some specific examples, those skilled in the art will recognize that our teachings are not so limited. Accordingly, our invention should be only limited by the scope of the claims attached hereto.

What is claimed is:

1. A method of estimating the power of a circuit, said method comprising the steps of:
    generating a Register-Transfer-Level aware, Cycle-Accurate Functional Description (RTL-CAFD) of the circuit, wherein said CAFD does not include an explicit manifestation of the circuit structure;
    simulating the generated RTL-CAFD in conjunction with a power model library of various RTL components; and
    producing a power estimate from the simulation.

2. The method of claim 1, wherein said generating step further comprises the steps of:
    producing a CAFD description of the circuit; and
    synthesizing the CAFD into an RTL-CAFD.

3. The method of claim 2 wherein said synthesizing step further comprises the steps of:
    assigning functional elements to RTL components in the CAFD description.

4. The method of claim 3 wherein said CAFDs are state-based CAFDs.

5. The method of claim 4 wherein each of said functional elements belongs to a unique state.

6. The method of claim 1 wherein each CAFD describes the behavior of the circuit for each cycle of its operation.

7. The method of claim 1 wherein the CAFD includes one or more virtual components.

8. The method of claim 7 wherein said virtual components include component I/O values in current and previous cycles.

9. A method of producing power estimates of a circuit, said method comprising the steps of:

generating a Cycle-Accurate Functional Description (CAFD) of the circuit which does not contain an explicit manifestation of the circuit structure;

simulating the generated CAFD; and producing a power estimate from the simulation.

10. The method of claim 9, further comprising the steps of:

preprocessing the CAFD description of the circuit so that each functional element is given a unique identifier.

11. The method of claim 10, further comprising the steps of:

synthesizing an RTL description of the circuit from the CAFD description.

12. The method of claim 11 further comprising the steps of:

extracting RTL information from the CAFD description wherein said extraction includes the correlation of RTL components to CAFD functional elements.

13. The method of claim 12 further comprising the steps of:

generating a mapping table to map the functional element into RTL components.

14. The method of claim 13 further comprising the steps of:

generating a select signal table for specifying which data inputs are selected in each control state.

15. The method of claim 14 further comprising the steps of:

instantiating a virtual component for each functionally-explicit RTL component and each multiplexer to keep a record of previous and current input vectors.

16. The method of claim 15 further comprising the steps of:

determining idle-cycle inputs to a component.

17. The method of claim 9 further comprising the steps of:

determining a set of important cycles for which to determine the power estimate.

* * * * *